(12) United States Patent
Ouimet

(10) Patent No.: US 12,173,837 B2
(45) Date of Patent: Dec. 24, 2024

(54) SUPPORTING APPARATUS AND DISPLAY DEVICE

(71) Applicant: Hanvon Ugee Technology Co., Ltd., Guangdong (CN)

(72) Inventor: Ethan Scott Ouimet, Vancouver, WA (US)

( * ) Notice: Subject to any disclaimer, the term of this patent is extended or adjusted under 35 U.S.C. 154(b) by 509 days.

(21) Appl. No.: 17/535,788

(22) Filed: Nov. 26, 2021

(65) Prior Publication Data

US 2023/0066309 A1    Mar. 2, 2023

(30) Foreign Application Priority Data

Aug. 30, 2021    (CN) .......................... 202122068303.5

(51) Int. Cl.
*F16M 11/10* (2006.01)
*F16M 11/04* (2006.01)
*F16M 11/20* (2006.01)

(52) U.S. Cl.
CPC ......... *F16M 11/105* (2013.01); *F16M 11/046* (2013.01); *F16M 11/2021* (2013.01); *F16M 2200/021* (2013.01)

(58) Field of Classification Search
CPC .. F16M 11/041; F16M 11/105; F16M 11/046; F16M 11/2021
USPC .................................. 248/652, 917; 361/681
See application file for complete search history.

(56) References Cited

U.S. PATENT DOCUMENTS

| | | | | |
|---|---|---|---|---|
| 6,639,788 B1* | 10/2003 | Liao | ...................... | G06F 1/1601 |
| | | | | 361/679.22 |
| 6,966,532 B2* | 11/2005 | Ishizaki | ............... | F16M 11/105 |
| | | | | 361/679.61 |
| 8,403,288 B2* | 3/2013 | Cheng | ................... | F16M 11/105 |
| | | | | 248/673 |
| 9,194,535 B2* | 11/2015 | Chen | ...................... | F16M 11/22 |
| 9,746,130 B2* | 8/2017 | Hung | ...................... | F16M 11/22 |
| 10,330,242 B1* | 6/2019 | Wang | ................... | H05K 5/0204 |
| 10,890,288 B2* | 1/2021 | Gurr | ..................... | H05K 5/0234 |
| 11,744,027 B2* | 8/2023 | Hsu | ....................... | F16M 11/041 |
| | | | | 361/807 |
| 2014/0340862 A1* | 11/2014 | Xu | .......................... | F16M 11/10 |
| | | | | 248/688 |
| 2015/0211675 A1* | 7/2015 | Shyu | ..................... | F16M 11/105 |
| | | | | 248/125.7 |
| 2021/0164606 A1* | 6/2021 | Cheng | .................... | F16M 11/28 |
| 2024/0084956 A1* | 3/2024 | Lee | ....................... | F16M 11/105 |

* cited by examiner

*Primary Examiner* — Todd M Epps
(74) *Attorney, Agent, or Firm* — Cole-Frieman & Mallon, LLP; John Laurence

(57) ABSTRACT

A supporting apparatus and a display device are disclosed. The supporting apparatus is configured for supporting an external apparatus, and includes: a bracket supported on a supporting surface and having a waist-shaped hole; and a rotating member with one end passing through the waist-shaped hole and the other end connected to the external apparatus. Under action of an external force, the rotating member is slidable and rotatable relative to the bracket in the waist-shaped hole. When the external force disappears, the rotating member remains stationary relative to the bracket.

16 Claims, 7 Drawing Sheets

SUPPORTING APPARATUS AND DISPLAY DEVICE

CROSS-REFERENCE TO RELATED APPLICATION

This application is based on and claims the benefit of priority from Chinese Patent Application No. 2021220683035, filed on 30 Aug. 2021, the entirety of which is incorporated by reference herein.

TECHNICAL FIELD

The disclosure relates to the technical field of support instruments, in particular to a supporting apparatus and a display device.

BACKGROUND

As a new painting tool, the drawing board can be presented as a painting by receiving electronic information, can be used many times, and is easy to save and transport, which changes the way of painting.

In the process of use, the drawing board is usually installed on a supporting apparatus, so as to give painters a suitable painting angle and facilitate the painters to use.

In the process of painting, it is usually necessary to adjust horizontal and vertical positions of the drawing board in order to better complete the painting. However, in the related supporting apparatuses, installation positions for the drawing board are all fixed, and placement of the drawing board in the horizontal and vertical directions cannot be adjusted, which is inconvenient for painters to use.

SUMMARY

The disclosure aims to solve at least one of the technical problems existing in the prior art. To this end, the disclosure proposes a supporting apparatus, which can facilitate users to adjust the placement state of a drawing board.

The disclosure further proposes a display device having the supporting apparatus mentioned above.

A supporting apparatus according to embodiments in a first aspect of the disclosure includes: a bracket supported on a supporting surface and having a waist-shaped hole; and a rotating member with one end passing through the waist-shaped hole and the other end connected to the external apparatus, where under action of an external force, the rotating member is slidable and rotatable relative to the bracket in the waist-shaped hole; and when the external force disappears, the rotating member remains stationary relative to the bracket.

The supporting apparatus according to the embodiments of the disclosure at least has the following beneficial effects. By arranging the waist-shaped hole on the bracket, through which the rotating member passes to be connected to the external apparatus, under the action of an external force, the rotating member can slide in a length direction of the waist-shaped hole while rotating, and when the external force disappears, the rotating member can remain stationary relative to the bracket, so that the external apparatus remains stationary at this time, and can stop at any state with the disappearance of the external force, which is convenient to use after adjustment.

According to some embodiments of the disclosure, the supporting apparatus further includes a slide rail and a rolling member, where the slide rail is provided on the bracket at a side facing the external apparatus, and a motion trail surface is provided on the slide rail; and the rolling member is connected to the rotating member in a direction perpendicular to an axial direction of the rotating member, and is capable of rolling relative to the motion trail surface.

According to some embodiments of the disclosure, the rolling member is provided in two, the two rolling members are arranged opposite to each other in the direction perpendicular to the axial direction of the rotating member.

According to some embodiments of the disclosure, the supporting apparatus further includes a connecting member, where the connecting member is connected between the external apparatus and the rotating member, the connecting member extends in the direction perpendicular to the axial direction of the rotating member, and the rolling member is disposed at an end of the connecting member.

According to some embodiments of the disclosure, the connecting member includes a connecting portion and a mounting portion in the direction perpendicular to the axial direction of the rotating member, the connecting portion is connected between the external apparatus and the rotating member, the mounting portion is configured to be connected with the rolling member, and the mounting portion has a width tapering in a direction away from the connecting portion.

According to some embodiments of the disclosure, the connecting member is provided with an avoidance grooved for guiding a wire to pass through.

According to some embodiments of the disclosure, the bracket includes a first supporting member and a second supporting member, the first supporting member is provided with the waist-shaped hole, and the second supporting member is rotatably connected to the first supporting member.

According to some embodiments of the disclosure, the bracket further includes a fastener, the fastener includes a connecting shaft and a handle, both the first supporting member and the second supporting member are rotatably connected to the connecting shaft, and the handle is in threaded connection with an end of the connecting shaft.

According to some embodiments of the disclosure, the supporting apparatus further includes a reinforcing member disposed on the bracket and surrounding the waist-shaped hole, where the rotating member is rotatable relative to the reinforcing member and the bracket.

A display device according to embodiments of the disclosure in a second aspect includes the supporting apparatus described above.

Additional aspects and advantages of the disclosure will be given in part in the following description, and in part will become apparent from the following description, or learned by practice of the disclosure.

BRIEF DESCRIPTION OF DRAWINGS

The disclosure is further described below in conjunction with accompanying drawings and embodiments, wherein.

Figure 1:
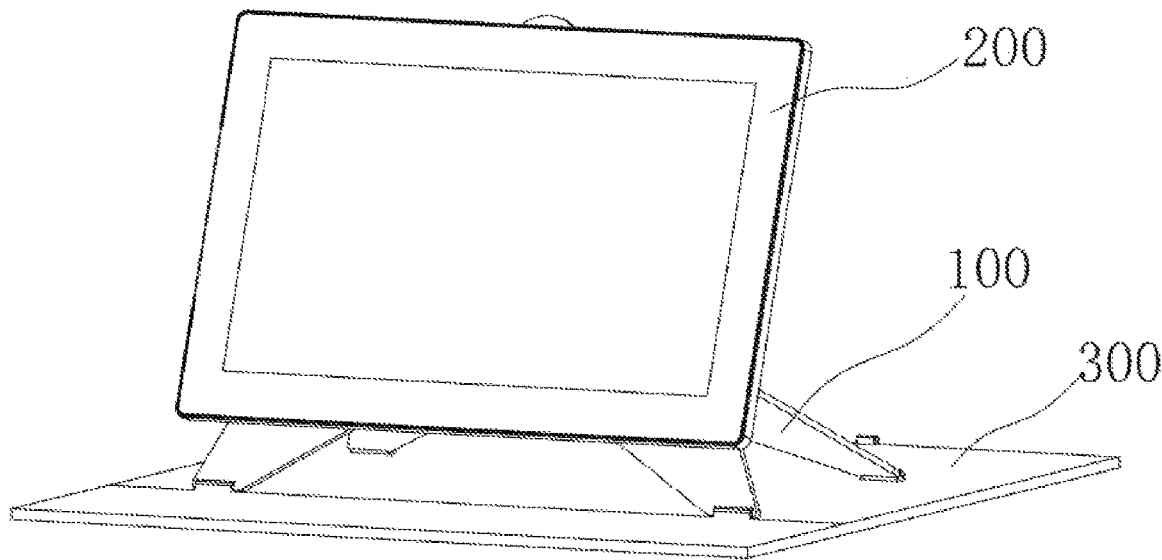
FIG. 1 shows a reference diagram of a use state of a supporting apparatus according to an embodiment of the disclosure, in an angle of view.

REFERENCE NUMERALS supporting apparatus 100;
bracket 110, waist-shaped hole 111, first supporting member 112, second supporting member 113, fastener 114, and handle 1141;
rotating member 120, rotating shaft 121, first annular portion 122, and second annular portion 123;
slide rail 130, motion trail surface 131, and limit portion 132;
rolling member 140;
reinforcing member 150;
connecting member 160, connecting portion 161, mounting portion 162, and avoidance groove 163;
external apparatus 200; and
supporting surface 300.

DETAILED DESCRIPTION

Embodiments of the disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the disclosure instead of being construed as limiting the disclosure.

In the description of the disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the disclosure and simplify the description only, rather than indicating or implying that the device or element referred to must have a specific orientation or be constructed and operated in a specific orientation, and therefore cannot be construed as limiting the disclosure.

In the description of the disclosure, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the disclosure, unless otherwise explicitly defined, the words such as "set", "install", and "connect" should be understood in a broad sense, and those skilled in the art can determine the specific meanings of the above words in the disclosure in a rational way in combination with the specific contents of the technical solutions.

In the description of the disclosure, description referring to the terms "an embodiment", "some embodiments", "illustrative embodiments", "examples", "specific examples", or "some examples", etc., is intended to indicate that specific features, structures, materials, or characteristics described in conjunction with the embodiments or examples are included in at least one embodiment or example of the disclosure. In the present description, a schematic representation for the above terms does not necessarily refer to the same embodiment or example. Moreover, the specific features, structures, materials, or characteristics described may be combined in a suitable manner in any one or more embodiments or examples.

Referring to FIGS. 1 to 8, which shows a supporting apparatus 100 for supporting an external apparatus 200 according to embodiments of the disclosure. The supporting apparatus 100 includes a bracket 110, a rotating member 120, a slide rail 130 and a rolling member 140.

Figure 2:
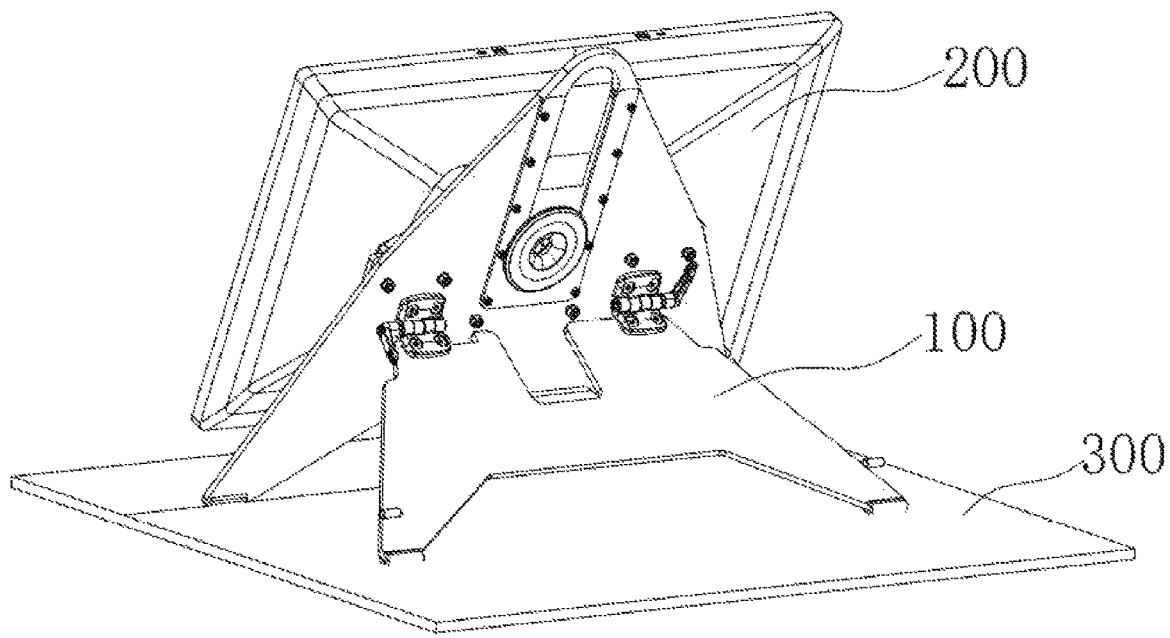
FIG. 2 shows a reference diagram of the use state of the supporting apparatus in FIG. 1, in another angle of view.
Figure 3:
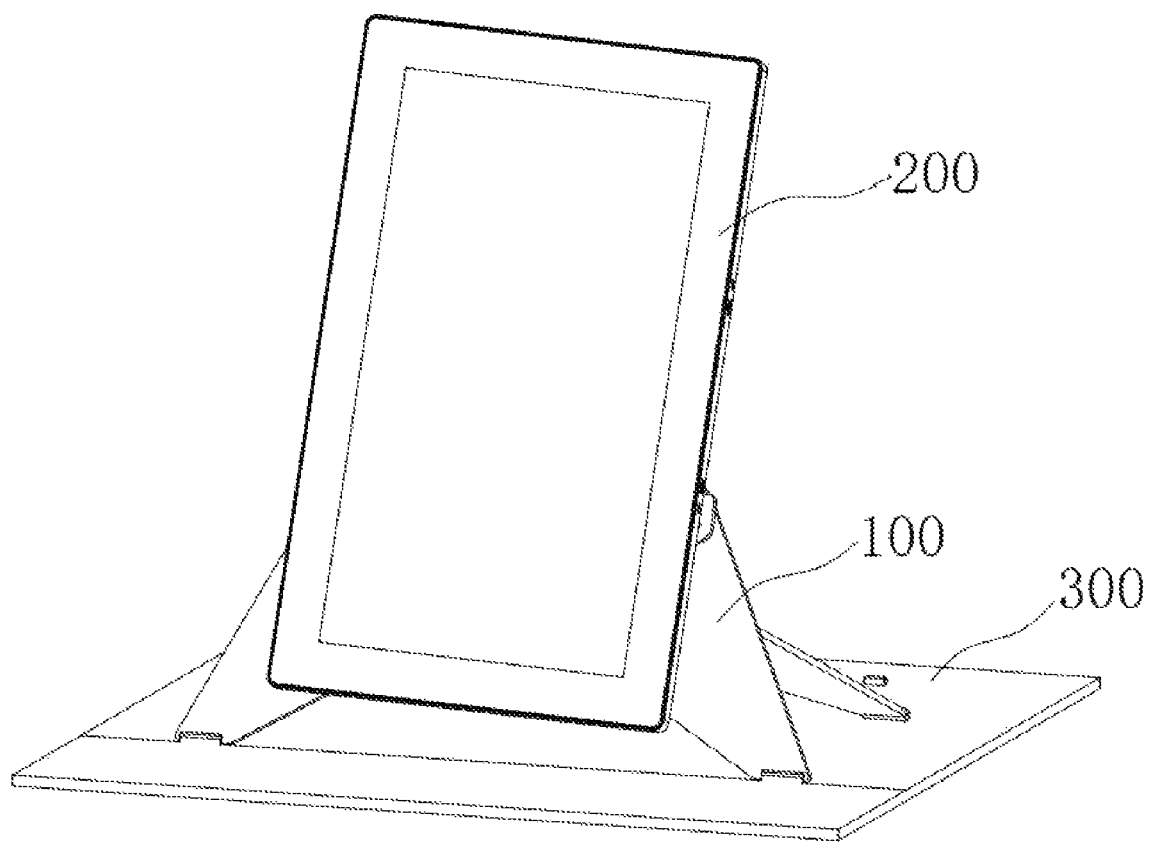
FIG. 3 shows a reference diagram of another use state of the supporting apparatus in FIG. 1.

FIG. 1 to FIG. 3 show a use state reference diagram of the supporting apparatus 100 supporting the external apparatus 200 on a supporting surface 300 in some embodiments.

Figure 4:
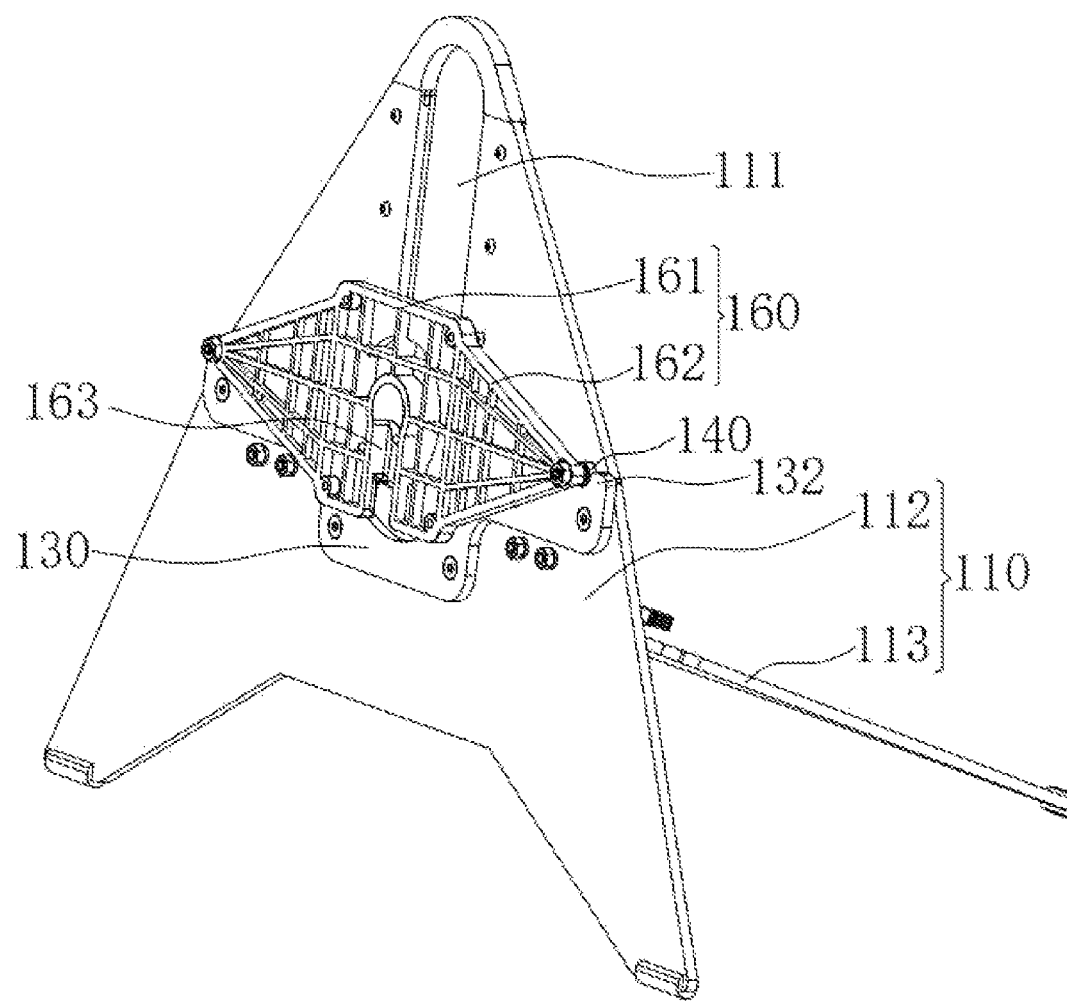
FIG. 4 shows a schematic structural diagram of the supporting apparatus in FIG. 1, in an angle of view.
Figure 5:
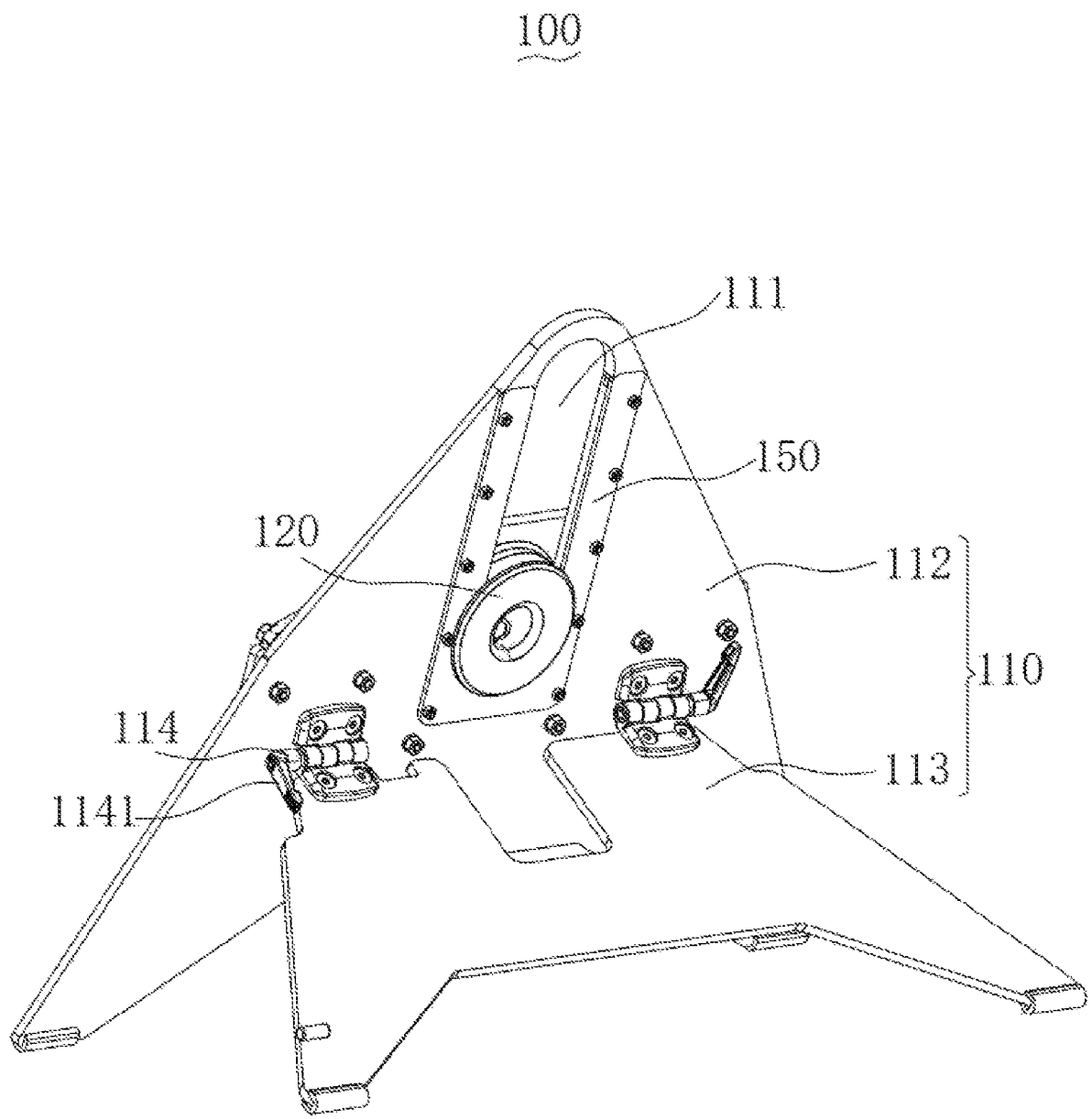
FIG. 5 shows a schematic structural diagram of the supporting apparatus in FIG. 4, in another angle of view.

Referring to FIGS. 4 and 5, the bracket 110 can be supported on the supporting surface 300, and a waist-shaped hole 111 is provided on the bracket 110. A rotating member 120 is connected to the external apparatus 200, one end of the rotating member 130 passes through the waist-shaped hole 111, and the other end of the rotating member 131 is connected to the external apparatus 200. Under the action of an external force, the rotating member 131 can slide and rotate relative to the bracket 110 in the waist-shaped hole 111. When the external force disappears, the rotating member 120 can remain stationary relative to the bracket 110.

In the supporting apparatus 100, by arranging the waist-shaped hole 111 on the bracket 110, through which the rotating member 120 passes to be connected to the external apparatus 200, under the action of an external force, the rotating member 120 can slide in a length direction of the waist-shaped hole 111 while rotating, and when the external force disappears, the rotating member 120 can remain stationary relative to the bracket 110, so that the external apparatus 200 remains stationary at this time, and can stop at any state with the disappearance of the external force, which is convenient to use after adjustment.

The external apparatus in some embodiments is a drawing screen with a rectangular shape and having a length direction and a width direction. When the length direction is parallel to a horizontal line, the drawing screen is in a horizontal state at this time. When the length direction is perpendicular to the horizontal line, the drawing screen is in a vertical state at this time. When placed on the supporting apparatus 100, in order to facilitate drawing paintings, a painter needs to adjust the placement state of the drawing screen. The drawing screen in FIGS. 1 and 2 is in a horizontal state, and the drawing screen in FIG. 3 is in a vertical state. In other use cases, the painter can adjust the drawing screen to other inclination angles.

The supporting surface 300 supporting the bracket 110 may be a flat plane, and may be a concavo-convex plane.

Referring to FIGS. 4 and 5, in an embodiment of the disclosure, in order to facilitate the adjustment of placement height of the external apparatus 200, the bracket 110 includes a first supporting member 112 and a second supporting member 113, the first supporting member 112 is provided with the waist-shaped hole 111, the second supporting member 113 is rotatably connected to the first supporting member 112, so that by rotating the second supporting member 113, different included angles can be formed between the first supporting member 112 and the second supporting member 113, thereby adjusting the placement height of the external apparatus 200.

In an embodiment of the disclosure, referring to FIG. 5, the bracket 110 also includes a fastener 114, the fastener 114 including a connecting shaft (not shown in the figure) and a handle 1141, both the first supporting member 112 and the second supporting member 113 are rotatably connected to the connecting shaft, and the handle 1141 is in threaded connection with one end of the connecting shaft, so that after the second supporting member 113 rotates to a suitable angle relative to the first supporting member 112, the second supporting member 113 and the first supporting member 112 can be locked and fixed by rotating the handle 1141. In other embodiments, it is possible to design that after the second supporting member 113 rotates relative to the first supporting member 112, the two members are locked and fixed by means of damping.

It can be understood that, in order to avoid sliding of the bracket 110 during use, an antiskid pad, for example, a rubber pad may be provided at a bottom of each of the second supporting member 113 and the first supporting member 112, to increase the frictional force of the second supporting member 113 and the first supporting member 112 relative to the supporting surface 300.

In the present embodiment, both the second supporting member 113 and the first supporting member 112 are flat plate-shaped, and in other embodiments, the second supporting member 113 may also be set to a rod shape to reduce its weight for easy carrying.

Figure 6:
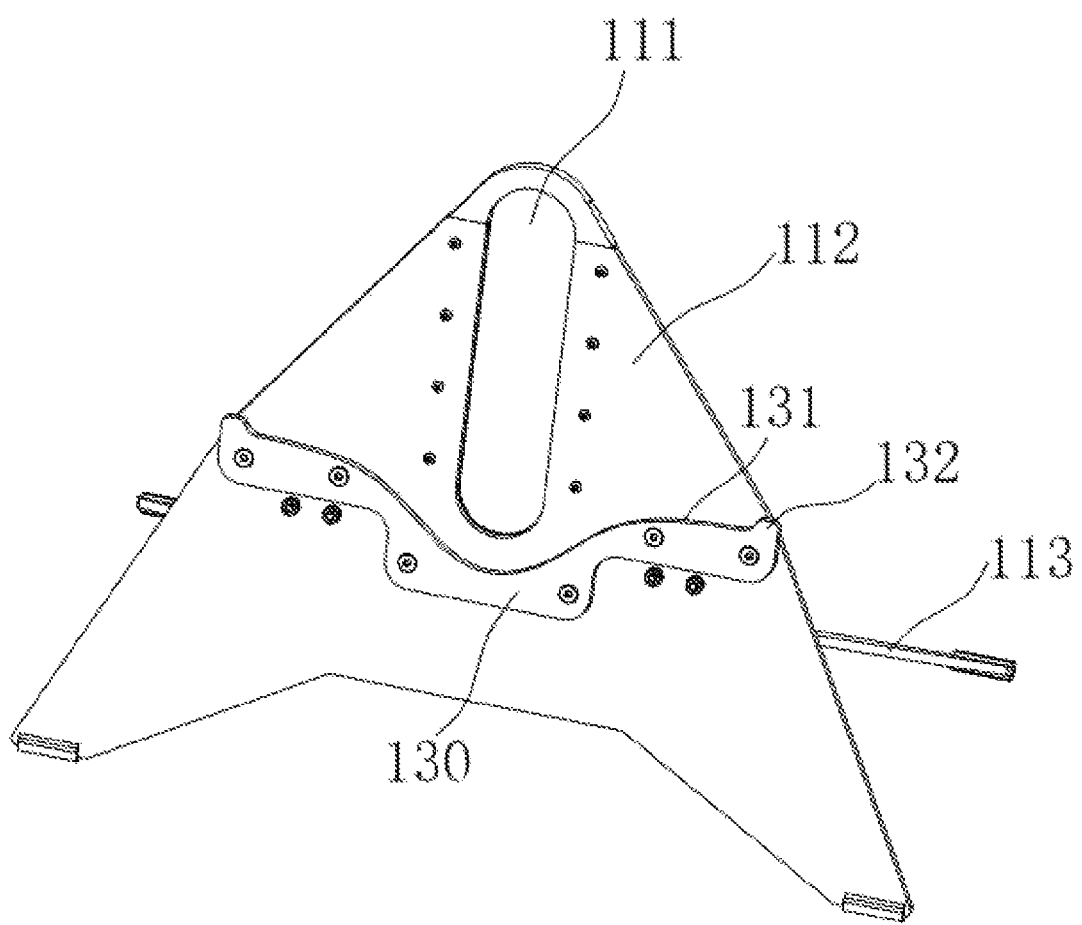
FIG. 6 shows a schematic structural diagram at the back of a hidden adjustment mechanism of the supporting apparatus in FIG. 3.

Referring to FIGS. 4 and 6, in an embodiment of the disclosure, the supporting apparatus 100 further includes a slide rail 130 and a rolling member 140, the slide rail 130 is provided on the bracket at a side 110 facing the external apparatus 200, and a motion trail surface 131 is provided on the slide rail 130. The rolling member 140 is connected to the rotating member 120 in an axial direction perpendicular to the rotating member 120, and can roll relative to the motion trail surface 131. By providing the slide rail 130 and the rolling member 140, the external apparatus 200 can be supported when the rotating member 120 and the external apparatus 200 remain stationary after position adjustment.

The motion trail surface 131 matched with the rolling motion trail of the rolling member 140 is provided on the slide rail 130, so that the rolling member 140 can roll along the slide rail 130 during movement. After completion of the movement, when the drawing screen is in a vertical state, the rolling member 140 abuts against the very bottom of an intermediate position of the motion trail surface 131, and at this time, the rotating member 120 abuts against the very top of the waist-shaped hole 111. When the drawing screen is in a horizontal state, the rolling member 140 is located at the end of the motion trail surface 131, and at this time, the rotating member 120 abuts against the very bottom of the waist-shaped hole 111. When the drawing screen is in other inclination angles, the rolling member 140 is located elsewhere on the motion trail surface 131.

Referring to FIG. 6, in an embodiment of the disclosure, in order to limit excessive movement of the rolling member 140 on the motion trail surface 131, the slide rail 130 is provided with a limit portion 132 in an axial direction of the rotating member 120, the limit portion 132 is formed by extending from an end of the slide rail 130 in a length direction of the waist-shaped hole 111, and when the rotating member 120 abuts against the very bottom of the waist-shaped hole 111, the rolling member 140 moves to the end of the slide rail 130, and is limited by the limit portion 132 from further movement.

Referring to FIG. 4, in an embodiment of the disclosure, in order to facilitate the adjustment of the drawing screen, the supporting apparatus 100 includes two rolling members 140, which are disposed opposite to each other in a direction perpendicular to the axial direction of the rotating member 120, so that when the drawing screen is adjusted, the drawing screen can be rotated not only clockwise, but also counterclockwise, so as to facilitate the user's operation.

In the present embodiment, the rolling members 140 are rollers, which are rotatably connected to the rotating member 120.

Figure 7:
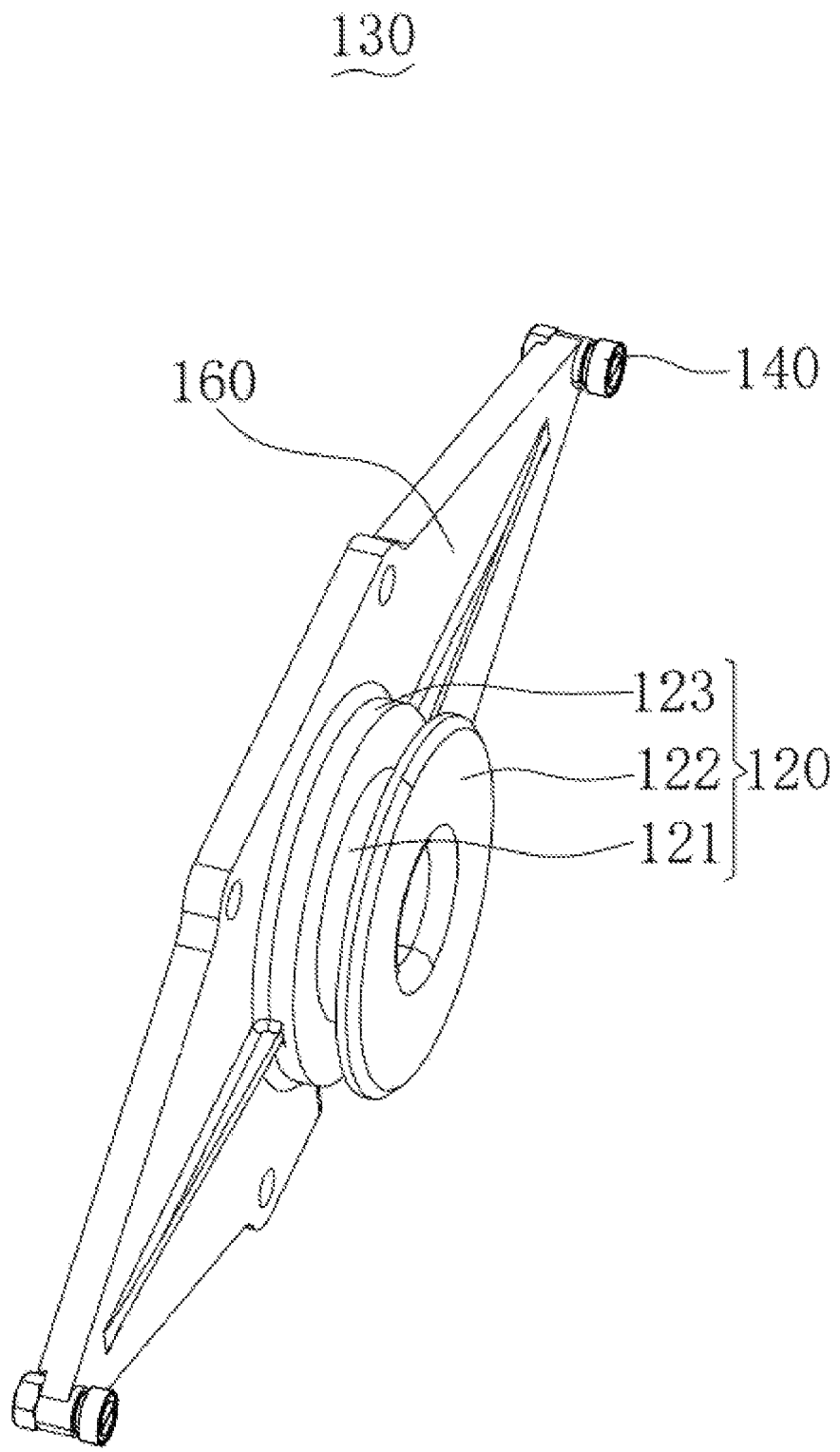
FIG. 7 shows a schematic structural diagram of the adjustment mechanism in FIG. 3, in an angle of view.

Referring to FIG. 7, in an embodiment of the disclosure, the rotating member 120 includes a rotating shaft 121, a first annular portion 122 and second annular portion 123, the second annular portion 123 is connected to the drawing screen, the rotating shaft 121 has an axial direction and passes through the waist-shaped hole 111, the bracket 110 is sandwiched between the first annular portion 122 and the second annular portion 123, and the rotating shaft 121 can slide and rotate along the side wall of the waist-shaped hole 111.

It can be understood that, referring to FIG. 5, in order to facilitate the clamping of the bracket 110, the supporting apparatus 100 further includes a reinforcing member 150, which is disposed on the bracket 110 and surrounds the waist-shaped hole 111, and the rotating member 120 is rotatably connected to the reinforcing member 150 and the bracket 110, thereby increasing the distance between the first annular portion 122 and the second annular portion 123, and increasing the supporting strength of the bracket 110.

Figure 8:
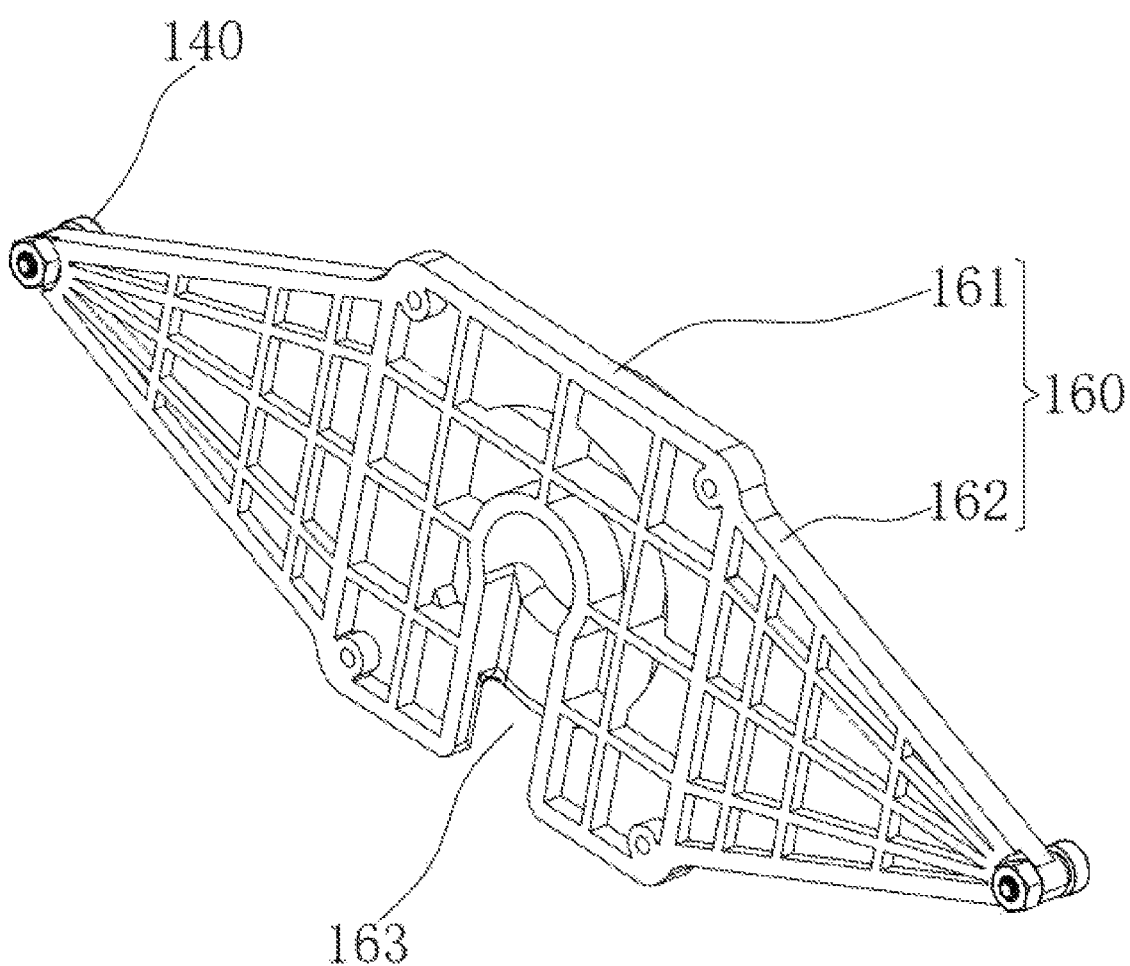
FIG. 8 shows a schematic structural diagram of the adjustment mechanism in FIG. 7, in another angle of view.

Referring to FIGS. 7 and 8, in an embodiment of the disclosure, the supporting apparatus 100 further includes a connecting member 160, which is connected between the external apparatus 200 and the rotating member 120 and extends in a direction perpendicular to the axial direction of the rotating member 120, and the rolling member 140 is disposed at an end of the connecting member 160. By providing the connecting member 60, the contact area between the rotating member 120 and the external apparatus 200 is increased, so that the external apparatus 200 is mounted more stably.

Particularly, in the present embodiment, the second annular portion 123 is connected to the connecting member 160.

In an embodiment of the disclosure, the connecting member 160 includes a connecting portion 161 and a mounting portion 162 in a direction perpendicular to the axial direction of the rotating member 120, the connecting portion 161 is connected between the external apparatus 200 and the rotating member 120, the mounting portion 162 is configured for being connected to the rolling member 140, and the mounting portion 162 has a width tapering in a direction away from the connecting portion 161, thereby reducing the weight of the connecting member 160 and facilitating user-friendly manual push, while ensuring the stability of the installation.

It can be understood that, in the present embodiment, the connecting member 160 includes two mounting portions 162, and the two mounting portions 162 are disposed at opposite ends of the connecting portion 160 in a direction perpendicular to the axial direction of the rotating member 120. The mounting portions 162 in the present embodiment are triangular, and each rolling member 140 is disposed at the apex of a respective one of the mounting portions 162.

It can be understood that, in order to facilitate guiding a wire of the drawing screen, the connecting portion 161 is also provided with an avoidance groove 163 for the wire to pass through, so that after the drawing screen is mounted on the connecting portion 161, the wire can be guided out from the avoidance groove 163.

In the supporting apparatus 100 of the disclosure, by providing the connecting member 160 connected between the rotating member 120 and the external apparatus 200, the mounting strength of the external apparatus 200 can be increased. By arranging the bracket 110 as including the first supporting member 112 and the second supporting member 113 rotatably connected to the first supporting member 112, different included angles can be formed between the first supporting member 112 and the second supporting member 113 by rotating the second supporting member 113, so that the placement height of the external apparatus 200 can be adjusted.

In other embodiments, the disclosure further provides a display device, including the supporting apparatus 100 mentioned above.

The embodiments of the disclosure have been described in detail in conjunction with the accompanying drawings, but the disclosure is not limited to the embodiments mentioned above. Within the scope of knowledge possessed by those of ordinary skill in the art, various changes may be made without departing from the purpose of the disclosure. In addition, the embodiments of the disclosure and features in the embodiments may be combined with each other to derive other embodiments not explicitly described.

What is claimed is:

1. A supporting apparatus for supporting an external apparatus, comprising:
   a bracket supported on a supporting surface and having a waist-shaped hole;
   a rotating member with one end passing through the waist-shaped hole and the other end connected to the external apparatus, wherein under action of an external force, the rotating member is slidable and rotatable relative to the bracket in the waist-shaped hole; and when the external force disappears, the rotating member remains stationary relative to the bracket; and
   a slide rail and a rolling member, wherein the slide rail is provided on the bracket at a side facing the external apparatus, and a motion trail surface is provided on the slide rail; and
   the rolling member is connected to the rotating member in a direction perpendicular to an axial direction of the rotating member, and is capable of rolling relative to the motion trail surface.

2. The supporting apparatus of claim 1, wherein the rolling member is provided in two, the two rolling members are arranged opposite to each other in the direction perpendicular to the axial direction of the rotating member.

3. The supporting apparatus of claim 1, further comprising a connecting member, wherein the connecting member is connected between the external apparatus and the rotating member, the connecting member extends in the direction perpendicular to the axial direction of the rotating member, and the rolling member is disposed at an end of the connecting member.

4. The supporting apparatus of claim 3, wherein the connecting member comprises a connecting portion and a mounting portion in the direction perpendicular to the axial direction of the rotating member, the connecting portion is connected between the external apparatus and the rotating member, the mounting portion is configured to be connected with the rolling member, and the mounting portion has a width tapering in a direction away from the connecting portion.

5. The supporting apparatus of claim 3, wherein the connecting member is provided with an avoidance grooved for guiding a wire to pass through.

6. The supporting apparatus of claim 1, wherein the bracket comprises a first supporting member and a second supporting member, the first supporting member is provided with the waist-shaped hole, and the second supporting member is rotatably connected to the first supporting member.

7. The supporting apparatus of claim 6, wherein the bracket further comprises a fastener, the fastener comprises a connecting shaft and a handle, both the first supporting member and the second supporting member are rotatably connected to the connecting shaft, and the handle is in threaded connection with an end of the connecting shaft.

8. The supporting apparatus of claim 1, further comprising a reinforcing member disposed on the bracket and surrounding the waist-shaped hole, wherein the rotating member is rotatable relative to the reinforcing member and the bracket.

9. A display device comprising a supporting apparatus, wherein the supporting apparatus comprises:
   a bracket supported on a supporting surface and having a waist-shaped hole;
   a rotating member with one end passing through the waist-shaped hole and the other end connected to the external apparatus, wherein under action of an external force, the rotating member is slidable and rotatable relative to the bracket in the waist-shaped hole; and when the external force disappears, the rotating member remains stationary relative to the bracket; and
   a slide rail and a rolling member, wherein the slide rail is provided on the bracket at a side facing the external apparatus, and a motion trail surface is provided on the slide rail; and
   the rolling member is connected to the rotating member in a direction perpendicular to an axial direction of the rotating member, and is capable of rolling relative to the motion trail surface.

10. The display device of claim 9, wherein the rolling member is provided in two, the two rolling members are arranged opposite to each other in the direction perpendicular to the axial direction of the rotating member.

11. The display device of claim 9, wherein the supporting apparatus further comprises a connecting member, wherein the connecting member is connected between the external apparatus and the rotating member, the connecting member extends in the direction perpendicular to the axial direction of the rotating member, and the rolling member is disposed at an end of the connecting member.

12. The display device of claim 11, wherein the connecting member comprises a connecting portion and a mounting portion in the direction perpendicular to the axial direction of the rotating member, the connecting portion is connected between the external apparatus and the rotating member, the mounting portion is configured to be connected with the rolling member, and the mounting portion has a width tapering in a direction away from the connecting portion.

13. The display device of claim 11, wherein the connecting member is provided with an avoidance grooved for guiding a wire to pass through.

14. The display device of claim 9, wherein the bracket comprises a first supporting member and a second supporting member, the first supporting member is provided with the waist-shaped hole, and the second supporting member is rotatably connected to the first supporting member.

15. The display device of claim 14, wherein the bracket further comprises a fastener, the fastener comprises a connecting shaft and a handle, both the first supporting member and the second supporting member are rotatably connected to the connecting shaft, and the handle is in threaded connection with an end of the connecting shaft.

16. The display device of claim 9, wherein the supporting apparatus further comprises a reinforcing member disposed on the bracket and surrounding the waist-shaped hole, wherein the rotating member is rotatable relative to the reinforcing member and the bracket.

\* \* \* \* \*